(12) United States Patent (10) Patent No.: US 8,771,138 B2
Van Batavia et al. (45) Date of Patent: Jul. 8, 2014

(54) HYBRID HYDRAULIC DRIVE SYSTEM ARCHITECTURE

(75) Inventors: Brian L. Van Batavia, Delano, MN (US); Timothy I. Meehan, Waconia, MN (US); Michael W. Olson, Minneapolis, MN (US); David L. Makis, Shakopee, MN (US); Michael J. Voigt, Chaska, MN (US); David S. Remba, Eden Prairie, MN (US); Don R. Draper, Chanhassen, MN (US)

(73) Assignee: Eaton Corporation, Cleveland, OH (US)

( * ) Notice: Subject to any disclaimer, the term of this patent is extended or adjusted under 35 U.S.C. 154(b) by 256 days.

(21) Appl. No.: 13/234,271

(22) Filed: Sep. 16, 2011

(65) Prior Publication Data

US 2013/0068056 A1 Mar. 21, 2013

(51) Int. Cl.
*B60W 10/02* (2006.01)
*B60W 10/08* (2006.01)
*H02P 15/00* (2006.01)
*B60K 6/442* (2007.10)
*F16H 37/06* (2006.01)

(52) U.S. Cl.
USPC ............. 477/6; 477/5; 477/8; 180/65.23; 74/661

(58) Field of Classification Search
USPC ............. 477/5, 6, 8; 475/1–5, 8, 72–83; 180/65.22, 65.23, 165, 53.4, 53.5; 74/661
See application file for complete search history.

(56) References Cited

U.S. PATENT DOCUMENTS 4,242,922 A * 1/1981 Baudoin ................. 477/68
5,495,912 A * 3/1996 Gray et al. ................ 180/165
5,845,731 A * 12/1998 Buglione et al. ........... 180/65.23
5,887,674 A 3/1999 Gray, Jr.
6,719,080 B1 4/2004 Gray, Jr.
7,125,362 B2 10/2006 Beaty et al.
7,252,020 B2 8/2007 Gray, Jr. et al.
7,689,341 B2 * 3/2010 Miller ....................... 701/70
7,856,816 B2 12/2010 Duray (Continued)

FOREIGN PATENT DOCUMENTS

DE 102006036846 A1 2/2008
EP 1122109 A2 8/2001

OTHER PUBLICATIONS

European Patent Office: International Search Report and Written Opinion issued in counterpart International Application No. PCT/US2012/052608. Date of Mailing: Nov. 21, 2012.

*Primary Examiner* — Tisha Lewis
(74) *Attorney, Agent, or Firm* — Dykema Gossett PLLC

(57) ABSTRACT

A vehicle drivetrain has a first driver, a first clutch to selectively couple the first driver with an engine, an energy storage device coupled to the first driver, a second driver coupled to the energy storage device and connected to a driveshaft, and a second clutch that selectively couples the first and second drivers. In one embodiment, the first clutch is opened and the second clutch is closed during a vehicle operating condition requiring high torque, the first clutch is closed and the second clutch is opened during a transient vehicle operating condition, and the first clutch and the second clutch are closed during a steady-state vehicle operating condition. Additional clutches may be included to reduce energy losses or provide multiple mechanical ratios. The drivers themselves may be pumps, motors, generators, combined pump/motors, or combined motor/generators, making the invention suitable for both hydraulic implementation and electric implementation.

23 Claims, 9 Drawing Sheets

(56) References Cited

U.S. PATENT DOCUMENTS

| | | | |
|---|---|---|---|
| 8,337,359 B2 * | 12/2012 | Hofbauer | 477/5 |
| 8,387,731 B2 * | 3/2013 | Rink | 180/65.275 |
| 8,408,341 B2 * | 4/2013 | Dalum et al. | 180/65.22 |
| 2005/0164827 A1 | 7/2005 | Beaty et al. | |
| 2009/0076690 A1 * | 3/2009 | Guo et al. | 701/51 |
| 2009/0283348 A1 * | 11/2009 | Ossyra | 180/165 |
| 2010/0120580 A1 | 5/2010 | Mepham et al. | |
| 2010/0186408 A1 | 7/2010 | Rose et al. | |

\* cited by examiner

| CLUTCH 16 STATE | CLUTCH 22 STATE | CLUTCH 44 STATE | CLUTCH 46 STATE | RESULTING SYSTEM STATE |
|---|---|---|---|---|
| OPEN | OPEN | OPEN | OPEN | COMPLETE DECOUPLING OF COMPONENTS |
| OPEN | OPEN | OPEN | CLOSED | COUPLING OF ONE PUMP/MOTOR TO SYSTEM OUTPUT SHAFT |
| OPEN | OPEN | CLOSED | OPEN | COUPLING OF ONE PUMP/MOTOR TO SYSTEM INTERMEDIATE SHAFT |
| OPEN | OPEN | CLOSED | CLOSED | COUPLING OF ONE PUMP/MOTOR TO SYSTEM INTERMEDIATE SHAFT |
| OPEN | CLOSED | OPEN | OPEN | COUPLING OF SYSTEM INTERMEDIATE SHAFT TO SYSTEM OUTPUT SHAFT |
| OPEN | CLOSED | OPEN | CLOSED | COUPLING OF SYSTEM INTERMEDIATE SHAFT TO SYSTEM OUTPUT SHAFT |
| OPEN | CLOSED | CLOSED | OPEN | COUPLING OF ONE PUMP/MOTOR TO SYSTEM INTERMEDIATE SHAFT |
| OPEN | CLOSED | CLOSED | CLOSED | COUPLING OF SYSTEM INTERMEDIATE SHAFT TO SYSTEM OUTPUT SHAFT |
| CLOSED | OPEN | OPEN | OPEN | COUPLING OF ONE PUMP/MOTOR TO SYSTEM OUTPUT SHAFT |
| CLOSED | OPEN | OPEN | CLOSED | COUPLING OF SYSTEM INPUT SHAFT TO SYSTEM OUTPUT SHAFT |
| CLOSED | OPEN | CLOSED | OPEN | COUPLING OF SYSTEM INPUT SHAFT TO SYSTEM INTERMEDIATE SHAFT |
| CLOSED | OPEN | CLOSED | CLOSED | COUPLING OF SYSTEM INPUT SHAFT TO SYSTEM INTERMEDIATE SHAFT |
| CLOSED | CLOSED | OPEN | OPEN | COUPLING OF SYSTEM INTERMEDIATE SHAFT TO SYSTEM OUTPUT SHAFT |
| CLOSED | CLOSED | OPEN | CLOSED | COUPLING OF SYSTEM INPUT SHAFT TO SYSTEM OUTPUT SHAFT |
| CLOSED | CLOSED | CLOSED | OPEN | COUPLING OF SYSTEM INTERMEDIATE SHAFT TO SYSTEM OUTPUT SHAFT |
| CLOSED | CLOSED | CLOSED | CLOSED | COUPLING OF ONE PUMP/MOTOR TO SYSTEM OUTPUT SHAFT |

FIG. 2

HYBRID HYDRAULIC DRIVE SYSTEM ARCHITECTURE

TECHNICAL FIELD

The present invention relates to vehicle transmission systems, and more particularly to hybrid hydraulic drive system architectures.

BACKGROUND OF THE INVENTION

The motor vehicle industry is actively working to develop alternative powertrain systems in an effort to improve vehicle fuel economy and reduce the level of pollutants exhausted into the air by conventional drivetrain systems equipped with internal combustion engines. Significant development efforts have been directed to electric and fuel-cell vehicles as well as hybrid hydraulic vehicles.

Unfortunately, these alternative drivetrain systems currently suffer from several limitations and, for all practical purposes, are still under development However, hybrid hydraulic and hybrid electric drivetrains have found success, particularly in vehicle applications with a lot of starting and stopping. Hydraulic drive systems facilitate conversion between mechanical energy (e.g., a mechanical output from an engine or a rotating shaft) and hydraulic energy (e.g., fluid pressure).

Hybrid hydraulic drive systems can generally be classified as series systems or parallel systems depending on the general arrangement of energy flow through the drivetrain system. One known application of a parallel hybrid hydraulic drive system is in a vehicle equipped with hydraulic launch assist (marketed by Eaton Corporation under the trademark HLA™). In conventional drive systems, frequent braking wastes a significant amount of energy as heat, especially in larger vehicles. Hybrid hydraulic drive systems capture this energy and subsequently release it at a selected time to assist the engine in launching the vehicle from the stopped position.

More particularly, when such a vehicle brakes, mechanical energy from the vehicle driveline is captured by the hydraulic drive system and stored in a high pressure accumulator as hydraulic energy. The stored hydraulic energy can then be converted back into mechanical energy by releasing the pressurized fluid stored in the high pressure accumulator. The mechanical energy can then be used to, for example, accelerate the vehicle or power other devices. However, current hydraulic drive systems are not as effective in improving fuel economy in applications where the vehicle operates at a consistent, steady-state speed. A regular gearbox, which creates a direct mechanical connection between the engine and the wheels, provides better efficiency and fuel economy during steady-state conditions.

Parallel hybrid systems address this issue through their ability to provide both a hydraulic and a mechanical power flow path through the system. However, the performance of a parallel hybrid system is also inherently limited by its dependence on a mechanical power path, which must provide multiple gear ratios to balance the power requirements of the vehicle with the capabilities of the engine. Essentially, the hybrid system is only able to add power to or subtract power from power that is transmitted through the traditional mechanical driveline.

Conversely, a series hybrid system can effectively decouple the power output of the engine from the power needs of the vehicle. In a series hybrid system, the main purpose of the engine is to replenish the supply of stored energy in the system. The stored energy is simultaneously used to provide energy to the vehicle as needed. The series configuration facilitates improved fuel economy by allow selection of engine operating points based on efficiency and other performance criteria instead of on the instantaneous energy needs of the vehicle. However, series hybrid systems lack a redundant mechanical power flow path through the system and therefore tend to be less efficient during periods of sustained vehicle speed (e.g., cruising).

Series hybrid systems are also perceived as less reliable than conventional mechanical power transmission systems and parallel hybrid systems due to the lack of a more traditional mechanical power transmission path. Series hybrid drivetrain systems are also more complex and more expensive due to the increased number and size of components needed to support the transfer of the full engine power range to the vehicle.

There is a desire for a hybrid hydraulic system that operates at high efficiency during both transient (e.g., start/stop) operation and steady-state operation while still having a simple and cost effective architecture

SUMMARY OF THE INVENTION

An embodiment of the invention is directed to a vehicle drivetrain having a first driver, a first clutch to selectively couple the first driver with an engine, a high-pressure accumulator hydraulically coupled to the first driver, a second driver hydraulically coupled to the high-pressure accumulator and connected to a driveshaft, and a second clutch that selectively couples the first driver and the second driver. In one mode, the first clutch is opened and the second clutch is closed during a vehicle operating condition requiring high torque, the first clutch is closed and the second clutch is opened during a start/stop vehicle operating condition, and the first clutch and the second clutch are closed during a steady-state vehicle operating condition. Additional clutches may be included to reduce energy losses or provide multiple mechanical ratios. The drivers may be pumps, motors, combined pump/motors, or combined motor/generators, making the invention suitable for both hydraulic implementation and electric implementation.

The invention is also directed to a method of operating a vehicle drivetrain having the architecture explained above in which the most appropriate system configuration is selected from the set of all possible configurations defined by the architecture.

BRIEF DESCRIPTION OF THE DRAWINGS

FIG. 2 is a chart illustrating possible clutch operating combinations according to one embodiment of the invention;

DETAILED DESCRIPTION OF THE INVENTION

Figure 1:
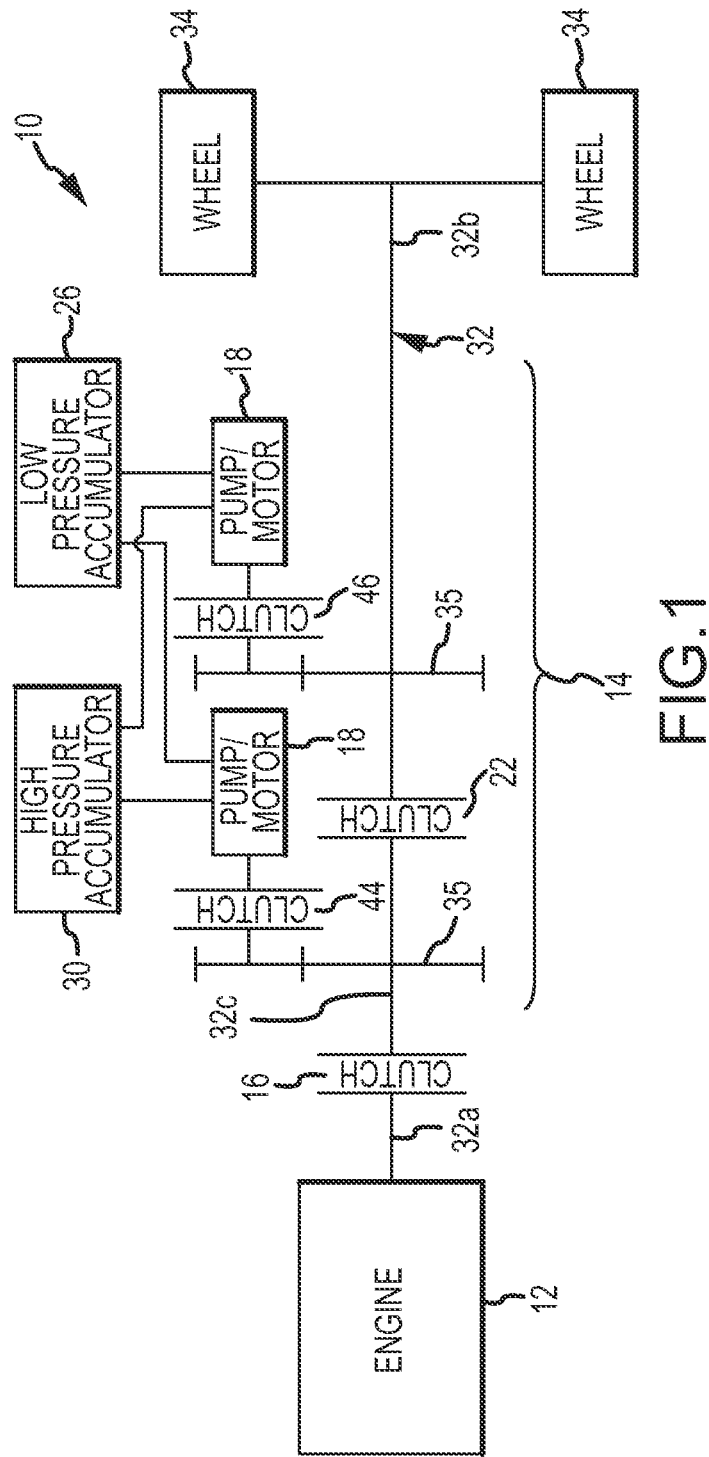
FIG. 1 illustrates a hydraulic implementation of a hybrid drive system architecture according to one embodiment of the invention.

FIG. 1 is a representative diagram of a hybrid hydraulic drive system 10 according to one embodiment of the invention. In this embodiment, the inventive system 10 includes a novel arrangement of components that allows the system 10 to be dynamically configured to either transfer power solely through hydraulic system components (like a series hybrid hydraulic system) or to simultaneously transfer power through both mechanical and hydraulic paths (like a parallel hybrid hydraulic system). The system 10 also reduces cost and complexity via an operation and control process that requires fewer components than existing systems.

The system 10 includes an engine 12 that is coupled to a transmission unit 14 via a first clutch 16. The first clutch 16 may be a conventional dry clutch normally used in a manual gearbox, but connected to an electronic actuator so that the clutch 16 can be opened and closed automatically by an electronic control unit (not shown) with included control software.

The transmission unit 14 includes two drivers, such as two pump/motors 18, that are coupled together via a second clutch 22. Those of skill in the art will understand that the terms "pump," "motor," "generator," "pump/motor," and "motor/generator" may be interchangeably used in the Detailed Description and that the omission of one element in describing the system 10 does not preclude the use of other elements in the system 10 instead.

The transmission unit 14 also includes a low pressure accumulator 26 and a high pressure accumulator 30. The low pressure accumulator 26 may either be a simple, unpressurized reservoir or a reservoir that pressurizes fluid a small amount. Note that keeping fluid within the low pressure accumulator 26 slightly pressurized avoids contamination of the fluid if the accumulator 26 is opened and also helps push fluid into the pump 18, especially during rapid vehicle speed changes. Those of ordinary skill in the art will understand that that the low pressure accumulator 26 may be replaced with a reservoir with or without venting to the atmosphere without departing from the scope of the invention.

When the pump/motor 18 is operating in a pump mode, it converts the mechanical power output of the engine 12 into hydraulic fluid flow, which is directed to the high pressure accumulator 30 and stored as pressurized fluid. In one embodiment, the high pressure accumulator 30 is a fixed volume accumulator. During certain vehicle operations, which will be described in greater detail below, at least one of the pump/motors 18 operates in a motor mode and converts the fluid pressure in the high pressure accumulator 30 into a mechanical torque to power a driveshaft 32 and turn a set of wheels 34. The driveshaft 32 and the pump/motors 18 may be coupled together via gears 35. The driveshaft 32 itself may have several sections, including an input shaft 32a (i.e., the portion of the driveshaft 32 between the engine 12 and the first clutch 16), an output shaft 32b (i.e., the portion of the driveshaft 32 between the second clutch 22 and the wheels 34), and an intermediate shaft 32c (i.e., the portion of the driveshaft 32 between the first clutch 16 and the second clutch 22).

In one embodiment, the pump/motors 18 are variable torque devices. Thus, the speed and torque of the input shaft 32a is not directly related to the speed and load of the output shaft 32b. Furthermore, due to the energy stored in the high pressure accumulator 30, the instantaneous input power to the system 10 by the engine 12 is not necessarily directly related to the instantaneous output power of the system 10 from the driveshaft 32. These properties facilitate advanced management of the engine 12 operating conditions and allow significant reductions in overall fuel consumption and emissions.

Moreover, if the pump/motors 18 are variable torque devices, the system 10 can provide the effect of an infinitely variable speed/torque ratio as long as they are coupled hydraulically and not coupled mechanically. The stored energy may also facilitate full-featured vehicle operation even with the engine turned off.

As noted above, the pump/motors 18 can each act as either a pump or a motor, depending on the needs of a particular vehicle operation. The second clutch 22 disposed between the two pump/motors 18 may be used to couple the two pump/motors 18 to provide additional torque. More particularly, when the second clutch 22 is closed, the two pump/motors 18 operate as two motors, two pumps, or one pump and one motor. In one mode of operation, when the second clutch 22 is open, the two pump/motors 18 disconnect from each other and may resume independent operation.

Both the first clutch 16 and the second clutch 22 may be electronically controlled. Using combination pump/motors 18 allows the same device to be used to either capture energy from or supply energy to both the system input and the system output shafts. This simplifies the system architecture, reduces cost, and provides a high level of operational flexibility.

The pump/motors 18 may be solenoid-controlled devices. However, other actuating methods (e.g., other electrical methods, electro-hydraulic methods, etc.) may be used without departing from the scope of the invention. In one embodiment, the pump 18 is a proportional device where a fluid displacement rate is proportional to the amount of current sent through the solenoid. Other methods may control the pump/motors 18 using different electrical command signals.

Starting movement of a vehicle from a dead stop or pushing a vehicle up a steep hill may require a large amount of torque. To generate this high torque, the second clutch 22 may be closed to operate both pump/motors 18 as motors, converting the fluid pressure in the high pressure accumulator 30 into mechanical energy. Since the transmission unit 14 essentially has two motors at this point, enough torque is generated to move the vehicle. The first clutch 16 may also be opened to disconnect the engine 12 from the pump 18; if sufficient fluid pressure exists in the high pressure accumulator 30, the vehicle can travel for a short distance on stored pressure alone, making the engine 12 unnecessary at this stage. It is also possible to close both the first and second clutches 16, 22, combining the engine torque with the torque generated by the pump/motors 18.

Once the vehicle starts rolling, the additional torque provided by the pump/motor 18 (while acting as a motor) is no longer needed. The first clutch 16 may be closed to connect the engine 12 to the pump/motor 18, and the second clutch 22 may be opened to disconnect the two pump/motors 18 from each other. At this stage, one pump/motor 18 acts as a pump and converts the mechanical output from the engine 12 into fluid pressure, which is later converted back into mechanical torque by the other pump/motor 18, which acts as a motor 18. In other words, the system 10 at this point operates as a series hybrid system because all of the power from the engine 12 goes into creating hydraulic pressure to turn the wheels 34 and because there is no mechanical connection between the engine 14 and the driveshaft 32.

Furthermore, under certain conditions, such as when the pump/motor 18 cannot achieve a desired torque using the instantaneous pressure in the accumulator 30, the system 10 is able to hydraulically isolate the high pressure accumulator 30 from the pump/motors 18 and momentarily operate like a traditional hydrostatic transmission.

When it is more efficient to do so (e.g., during high-speed, steady-state operation), the system 10 closes both the first clutch 16 and the second clutch 22 to create a direct mechanical link between the engine 12 and the driveshaft 32. This allows the system 10 to take advantage of the higher efficiencies found in mechanical drivetrains during steady-state operations while also having the advantages of traditional hybrid drivetrains during transient operations.

If the pump/motors 18 are still connected to the driveshaft 32 during steady-state operation, the parasitic energy losses created by moving parts inside the pump 18 and the motor 20 (or the pump/motors 38, 40) may still reduce efficiency and waste energy generated by the engine 12. To avoid this problem, third and fourth clutches 44, 46 may be included between the pump/motors 18 and the driveshaft 32. The third and fourth clutches 42, 44 completely disconnect the pump/motors 18 from the driveshaft 32 to maximize the overall efficiency of power transfer.

FIG. 2 is a table illustrating possible combinations of the clutches 16, 22, 44, 46. This chart is applicable to any of the embodiments having four clutches, including FIG. 1. Several of these clutch combinations and their corresponding system 10 operating conditions (e.g., steady-state, high torque, etc.) have already been described in greater detail above with respect to FIG. 1. Those of ordinary skill in the art will be able to determine, based on the information disclosed in this application, which clutch combinations and resulting system connections would be appropriate for desired system 10 operating conditions in a given application.

Figure 3:
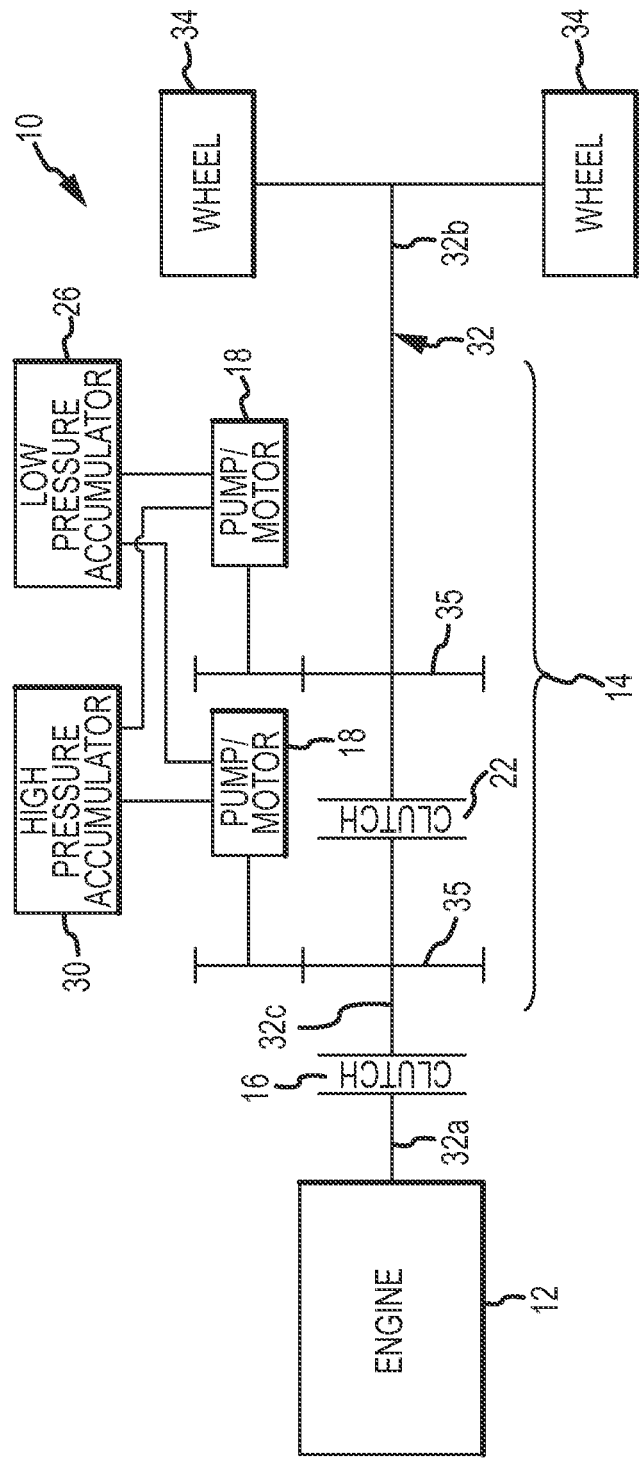
FIG. 3 illustrates a hydraulic implementation of a hybrid drive system architecture according to another embodiment of the invention.

FIG. 3 shows an embodiment of the system 10 without the third and fourth clutches 44, 46. If the vehicle will be used primarily in start/stop applications and will not experience cruising speeds or steady state operation often, the third and fourth clutches 44, 46 can be omitted from the transmission unit 14 to further simplify the system architecture and reduce the cost of the system 10.

Figure 4:
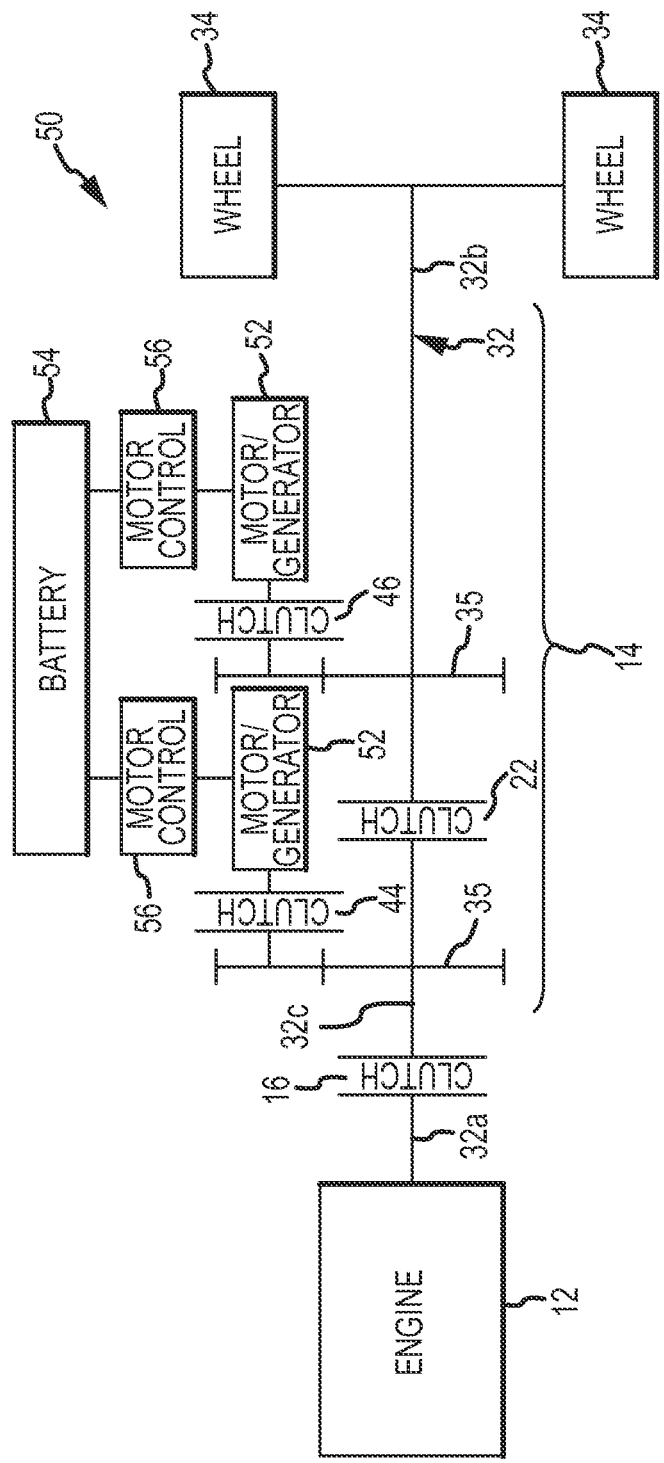
FIG. 4 illustrates an electric implementation of a hybrid drive system architecture according to one embodiment of the invention.
Figure 5:
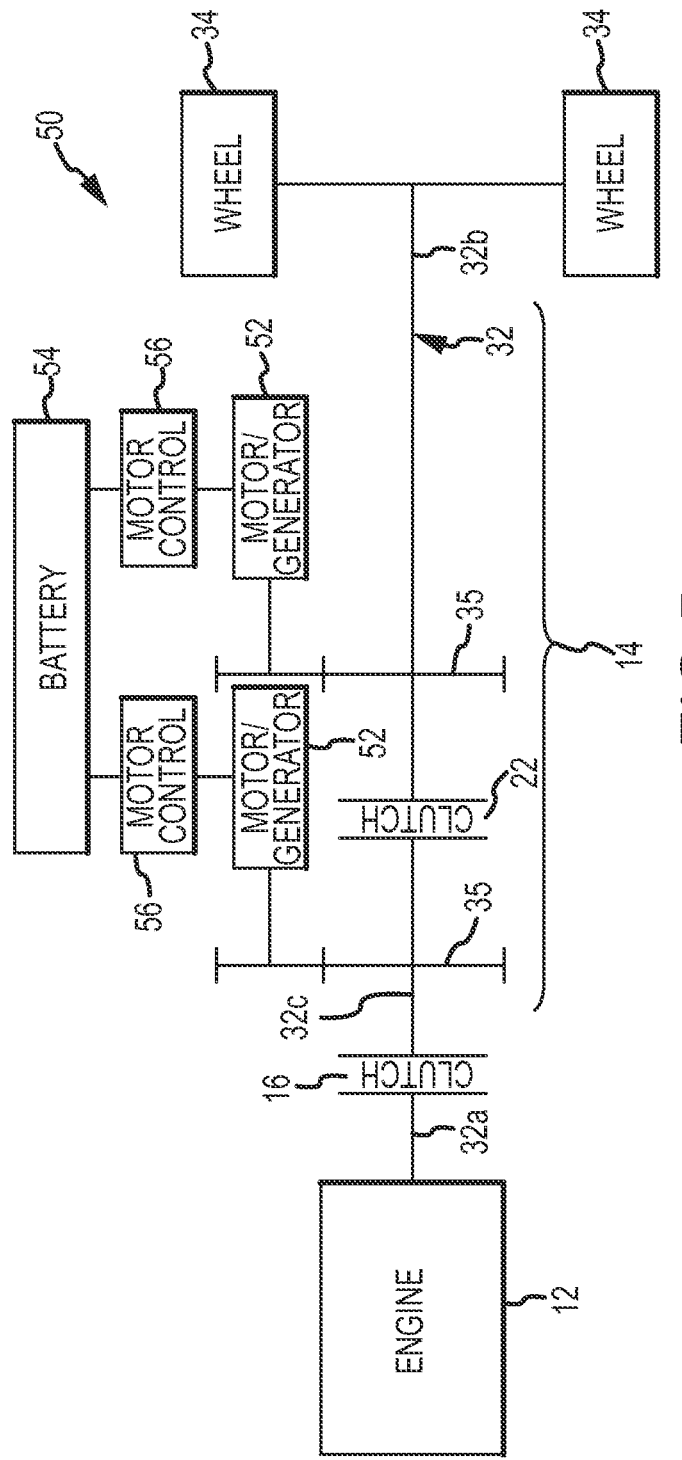
FIG. 5 illustrates an electric implementation of a hybrid drive system architecture according to another embodiment of the invention.

FIGS. 4 and 5 are representative diagrams of hybrid electric drive systems 50 with architectures corresponding to the hybrid hydraulic drive systems 10 shown in FIGS. 1 and 3, respectively. The electric system 50 uses motor/generators 52 instead of pump/motors 18 as the drivers. Also, the electric system 50 uses a battery 54 instead of a high pressure accumulator 30 for energy storage. Other energy storage devices, such as flywheels or capacitors, may be used in place of the battery 54. The motor/generators 52 may be controlled by motor controls 56 in any known manner.

Figure 6:
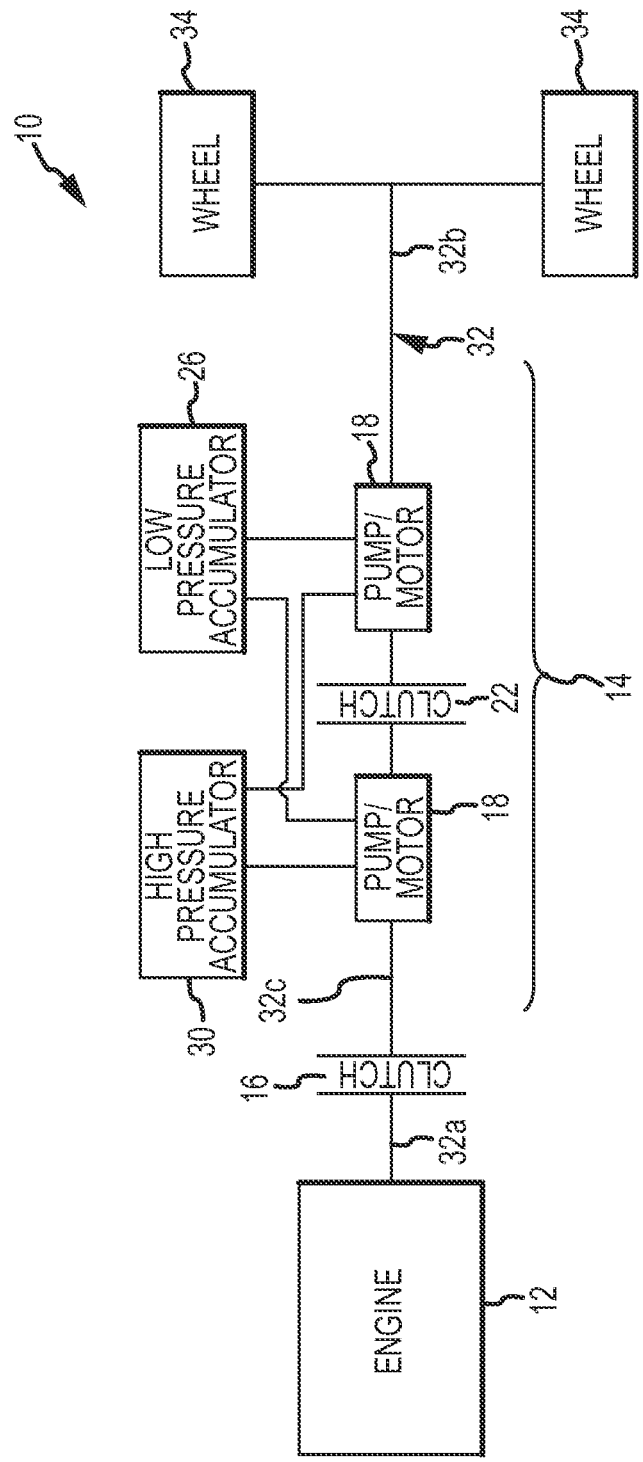
FIG. 6 illustrates a hydraulic implementation of a hybrid drive system architecture according to a further embodiment of the invention.
Figure 7:
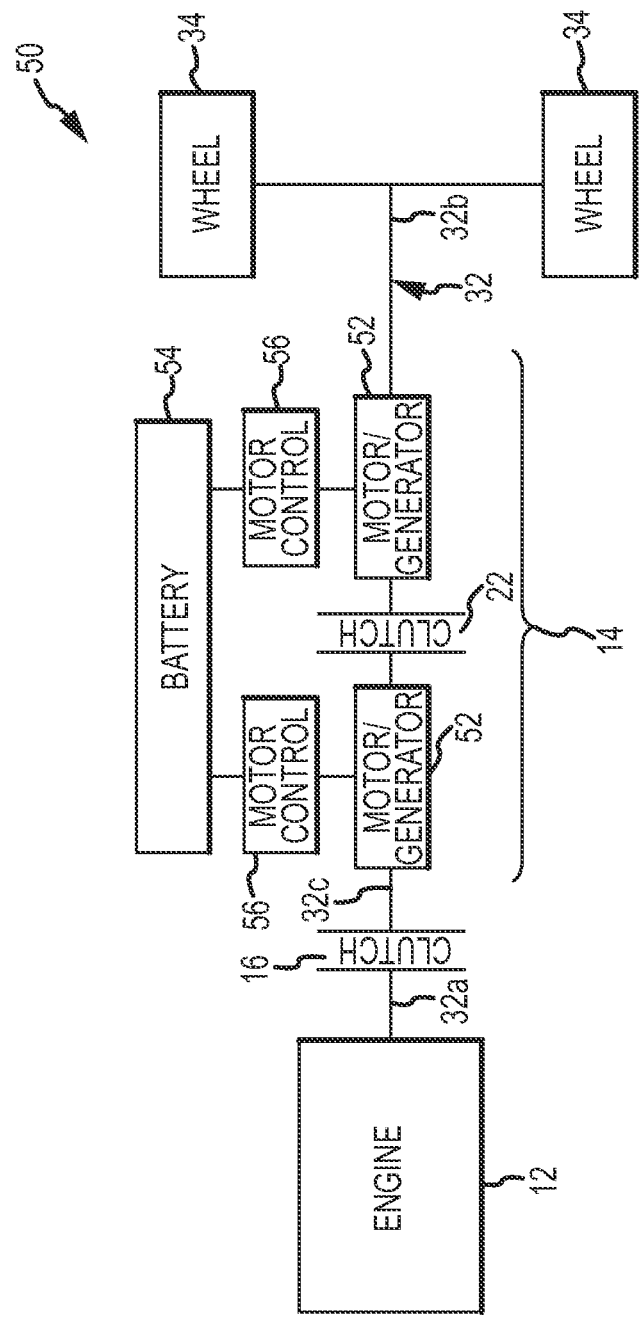
FIG. 7 illustrates an electric implementation of a hybrid drive system architecture according to a further embodiment of the invention.

FIGS. 6 and 7 illustrate variations of the systems 10, 50 shown in FIGS. 3 and 5, respectively. In this embodiment, the pump/motors 18 or motor/generators 52 are integral components of the driveshaft 32 instead of being coupled indirectly through gears 35. In other words, the pump/motors 18 or motor/generators 52 used in this embodiment employ a through-shaft design. This further reduces cost and simplifies the design of the system 10, 50.

Figure 8:
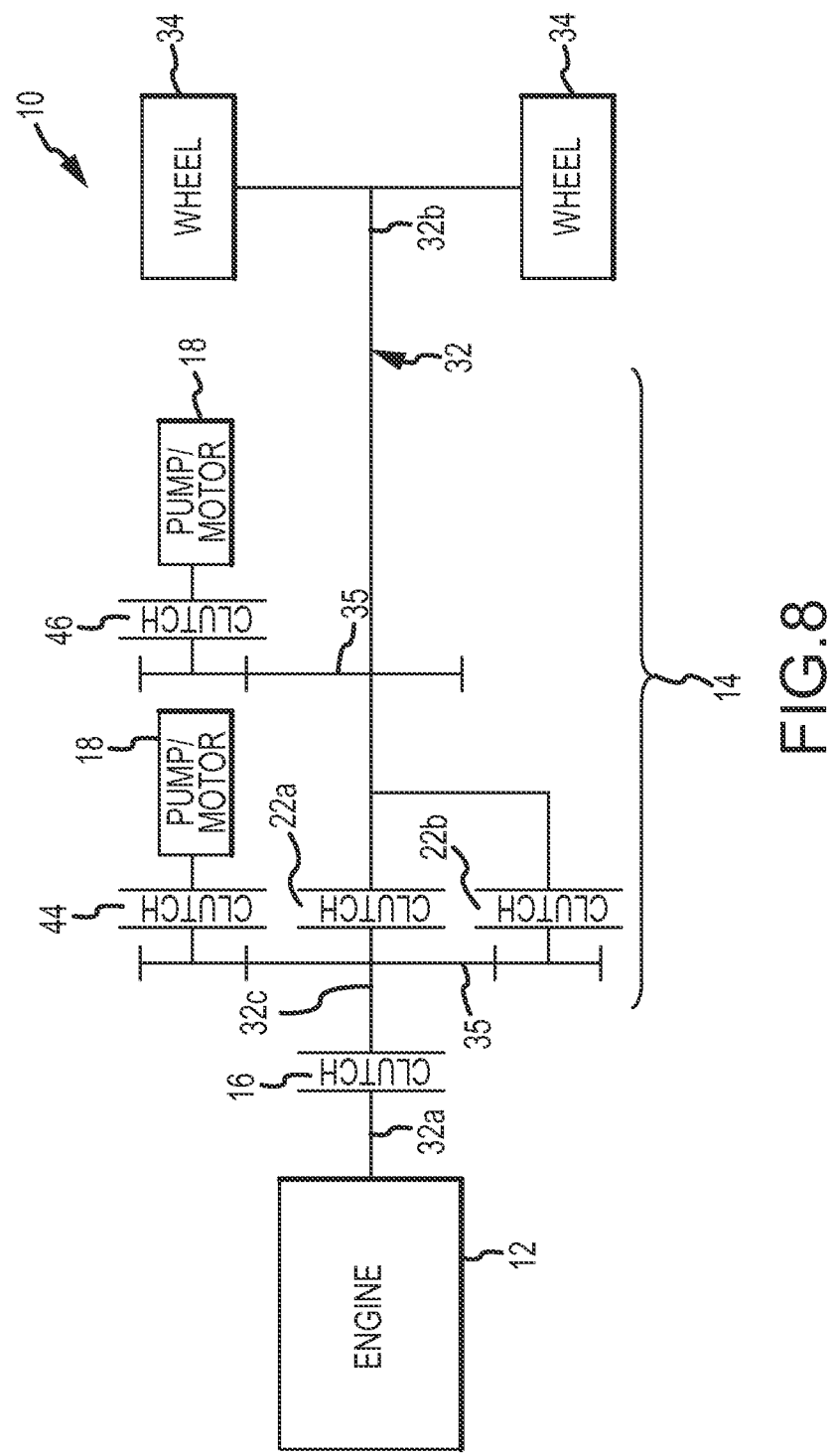
FIG. 8 illustrates a hydraulic implementation of a hybrid drive system architecture according to yet another embodiment of the invention.
Figure 9:
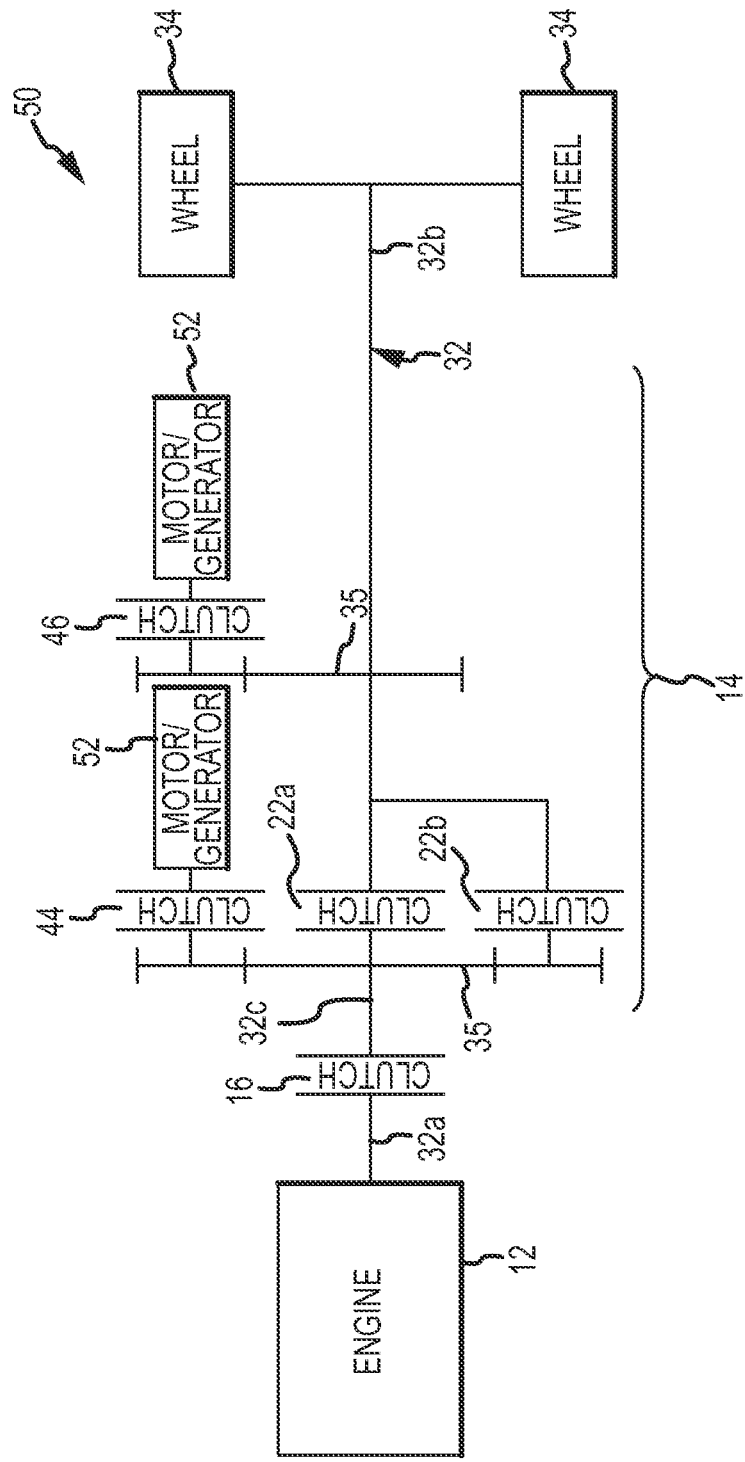
FIG. 9 illustrates an electric implementation of a hybrid drive system architecture according to yet another embodiment of the invention.

FIGS. 8 and 9 illustrate variations of the systems 10, 50 shown in FIGS. 1 and 3, respectively. For simplicity, FIGS. 8 and 9 do not show an energy storage device (i.e., a high pressure accumulator 30 or a battery 54, flywheel, capacitors, etc). As explained above, there are some operating conditions where it is more efficient to provide a direct mechanical link between the engine 12 and the driveshaft 32. However, some applications may benefit from more than one available mechanical ratio between the driveshaft 32 speed and the engine 12 speed. The embodiments shown in FIGS. 8 and 9 allow selection of multiple gear ratios during steady-state operation. More particularly, these embodiments include multiple clutches 22a, 22b arranged in parallel for connecting the engine 12 to the driveshaft 32. Each clutch 22a, 22b may be associated with a different gear ratio.

During operation, the clutch 22a, 22b with the desired gear ratio is closed and the others are opened. Although the Figures show two parallel clutches 22a, 22b, any number of clutches and associated mechanical linkages may be included to provide additional gear ratio options. Note that although FIGS. 8 and 9 show the third and fourth clutches 44, 46 for disconnecting the pump/motors 18 or motor/generators 52 from the driveshaft 32 during steady-state operation, these clutches 44, 46 may be omitted if desired.

The inventive system 10, 50 therefore provides the performance advantages of a parallel hybrid system (e.g., capture and supply of hydraulic or electric energy during transient conditions, efficient mechanical transfer of energy during steady-state conditions) and the advantages of a series hybrid system (e.g., efficient engine operation, vehicle operation with the engine off, reduced noise) in an architecture that is less complex and more cost-effective than a traditional series hybrid system. By arranging drivers and multiple clutches in the inventive manner, the invention may incorporate components, such as the pump/motor and the motor/generator, normally used in a other hybrid system architectures and use them in a different way via a novel clutch arrangement. Moreover, the inventive architecture is a series hybrid system that can still provide a direct mechanical connection between the engine and the driveshaft without requiring a separate mechanical linkage.

While the preferred embodiments for carrying out the invention have been described in detail, those familiar with the art to which this invention relates will recognize various alternative designs and embodiments for practicing the invention within the scope of the appended claims.

What is claimed is:

1. A vehicle drivetrain, comprising:
a first driver;
a first clutch to selectively couple the first driver with an engine;
an energy storage unit coupled to the first driver;
a driveshaft;
a second driver coupled to the energy storage unit and the driveshaft; and
a second clutch that selectively couples the first and second drivers;
wherein the first and second clutch are actuated such that the first clutch is opened and the second clutch is closed during a vehicle operating condition requiring high torque;
the first clutch is closed and the second clutch is opened during a transient vehicle operating condition;
the first clutch and the second clutch are closed during a steady-state vehicle operating condition; and
the first clutch is also closed and the second clutch is also opened during a vehicle operation condition where isolating the energy storage unit from the first and second drivers is desired.

2. The vehicle drivetrain of claim 1, wherein at least one of first and second drivers is a pump/motor, and the energy storage unit is a high pressure accumulator.

3. The vehicle drivetrain of claim 1, wherein at least one of the first and second drivers is a motor/generator.

4. The vehicle drivetrain of claim 3, wherein the energy storage unit at least one selected from the group consisting of a battery, flywheel, or capacitor.

5. The vehicle drivetrain of claim 1, wherein at least one of the first and second drivers is actuated via one of electrical control and electro-hydraulic control.

6. The vehicle drivetrain of claim 1, wherein at least one of the first and second drivers is solenoid-operated.

7. The vehicle drivetrain of claim 1, further comprising at least one gear coupling at least one of the first and second drivers to the driveshaft.

8. The vehicle drivetrain of claim 7, wherein said at least one gear comprises a first gear coupling the first driver to the driveshaft and a second gear coupling the second driver to the driveshaft.

9. The vehicle drivetrain of claim 1, wherein said first and second drivers are integrated with the driveshaft.

10. The vehicle drivetrain of claim 1, wherein at least one of the first clutch and the second clutch is actuated via one of electrical control and electro-hydraulic control.

11. The vehicle drivetrain of claim 1, wherein the first and second clutch are actuated such that
the first clutch is opened and the second clutch is closed during a vehicle operating condition to operate the first and second drivers as motors;
the first clutch is closed and the second clutch is opened during a transient vehicle operating condition to operate the first driver as a pump and the second driver as a motor; and
the first clutch and the second clutch are closed during a steady-state vehicle operating condition to create a direct link between the engine and the driveshaft.

12. The vehicle drivetrain of claim 11, wherein both the first and second clutches are closed during a second vehicle operating condition requiring high torque.

13. The vehicle drivetrain of claim 11, wherein the first clutch is also closed and the second clutch is also opened during a vehicle operating condition, and where the energy storage unit is isolated from the first and second drivers to operate the vehicle drivetrain as a hydrostatic transmission.

14. The vehicle drivetrain of claim 1, wherein the first and second clutch are actuated such that
the first clutch and the second clutch are closed during a vehicle operating condition requiring high torque;
the first clutch is closed and the second clutch is opened during a transient vehicle operating condition; and
the first clutch and the second clutch are closed during a steady-state vehicle operating condition.

15. The vehicle drivetrain of claim 1, further comprising a third clutch disposed between the driveshaft and at least one of the first and second drivers.

16. The vehicle drivetrain of claim 1 further comprising:
a third clutch disposed between the first driver and the driveshaft; and
a fourth clutch disposed between the second driver and the driveshaft,
wherein the third and fourth clutches open during a steady-state vehicle operating condition.

17. The vehicle drivetrain of claim 1 further comprising at least one supplemental second clutch, wherein the second clutch and said at least one supplemental second clutch correspond to different gear ratios.

18. A method for operating a vehicle drivetrain having a first driver, a first clutch to selectively couple the first driver with an engine, an energy storage unit coupled to the first driver, a second driver coupled to the energy storage unit and connected to a driveshaft, and a second clutch that selectively couples the first and second drivers, the method comprising the steps of:
opening the first clutch and closing the second clutch during a vehicle operating condition requiring high torque;
closing the first clutch and opening the second clutch during a transient vehicle operating condition; and
closing both the first clutch and the second clutch during a steady-state vehicle operating condition;
further comprising also closing the first clutch and also opening the second clutch during a vehicle operating condition where isolating the energy storage unit from the first and second drivers is desired.

19. The method of claim 18, further comprising the step of closing both the first and second clutches during a second vehicle operating condition requiring high torque.

20. The method of claim 18, further comprising also closing the first clutch and also opening the second clutch during a vehicle operating condition, and where the energy storage unit is isolated from the first and second drivers to operate the vehicle drivetrain as a hydrostatic transmission.

21. The method of claim 18, wherein the vehicle drivetrain includes a third clutch disposed between the driveshaft and at least one of the first and second drivers, and wherein the method further comprises opening the third clutch during a steady-state vehicle operation.

22. The method of claim 18, wherein the vehicle drivetrain includes a third clutch disposed between the first driver and the driveshaft and a fourth clutch disposed between second driver and the driveshaft, and wherein the method further comprises opening the third clutch and the fourth clutch during a steady-state vehicle operation.

23. The method of claim 18, further comprising at least one supplemental second clutch, wherein the second clutch and said at least one supplemental second clutch correspond to different gear ratios, and wherein the method further comprising closing one of said second clutch and said at least one second supplemental clutch.

\* \* \* \* \*